United States Patent
Brady et al.

(10) Patent No.: US 7,211,346 B2
(45) Date of Patent: May 1, 2007

(54) CORROSION RESISTANT METALLIC BIPOLAR PLATE

(75) Inventors: Michael P. Brady, Oak Ridge, TN (US); Joachim H. Schneibel, Knoxville, TN (US); Bruce A. Pint, Knoxville, TN (US); Philip J. Maziasz, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 247 days.

(21) Appl. No.: 10/403,472

(22) Filed: Mar. 31, 2003

(65) Prior Publication Data
US 2003/0190515 A1    Oct. 9, 2003

Related U.S. Application Data

(60) Provisional application No. 60/369,754, filed on Apr. 3, 2002.

(51) Int. Cl.
*H01M 2/00* (2006.01)
*H01M 2/08* (2006.01)

(52) U.S. Cl. .......................................... 429/34; 429/35
(58) Field of Classification Search ................. 429/34, 429/35
See application file for complete search history.

(56) References Cited

U.S. PATENT DOCUMENTS 3,841,847 A * 10/1974 Jones et al. ................. 420/428
5,445,683 A * 8/1995 Tahara et al. ............... 148/317
5,683,828 A    11/1997 Spear et al.
5,798,188 A    8/1998 Mukohyama et al.
2001/0039984 A1 * 11/2001 Nonomura et al. ......... 148/677
2002/0057984 A1 * 5/2002 Speidel et al. .............. 420/445
2002/0081478 A1 * 6/2002 Busenbender ................ 429/34

OTHER PUBLICATIONS

G. Bertrand et al, "A Study of the Corrosion Behaviour and Protective Quality of Sputtered Chromium Nitride Coatings," Surface and Coatings Technology 126 (2000) 199-209, Elsevier.
Masami Taguchi et al, "Effect of Surface Nitriding on Corrosion Resistance of Chromium in Sulfuric Acid Solution," Materials Transactions, KIM, vol. 32, #12 (1991), pp. 1170-1176.
A. A. Kodentsov et al, "High-Temperature Nitridation of Ni-Cr Alloys," Metallurgical & Materials Transactions A, vol. 27A, (Jan. 1996) pp. 59-69.

* cited by examiner

Primary Examiner—Dah-Wei Yuan
(74) Attorney, Agent, or Firm—Akerman Senterfitt; Neil R. Jetter

(57) ABSTRACT

A corrosion resistant, electrically conductive component such as a bipolar plate for a PEM fuel cell includes 20–55% Cr, balance base metal such as Ni, Fe, or Co, the component having thereon a substantially external, continuous layer of chromium nitride.

18 Claims, 3 Drawing Sheets

CORROSION RESISTANT METALLIC BIPOLAR PLATE

CROSS-REFERENCE TO RELATED APPLICATIONS

This application claims the benefit of U.S. Provisional Application No. 60/369,754 filed on Apr. 3, 2002, the entire disclosure of which is incorporated herein by reference.

The United States Government has rights in this invention pursuant to contract no. DE-AC05-00OR22725 between the United States Department of Energy and UT-Battelle, LLC.

FIELD OF THE INVENTION

The present invention relates to components such as metal bipolar plates for proton exchange membrane (PEM) fuel cells and other chemical-to-electrical energy conversion devices, and more particularly to metal bipolar plates having thermally grown nitrided surface layers to enhance corrosion resistance thereof.

BACKGROUND OF THE INVENTION

Chemical-to-electrical energy conversion devices, especially PEM fuel cells, are of great interest as efficient, non-polluting power sources for automotive applications, and also for stationary applications such as distributed power sources for buildings and houses as well as portable power generation for consumer electronic devices. A major barrier to commercial application of this technology is the cost of the devices.

A key component of the fuel cell design (and for electrochemical power generation devices in general, such as some battery designs) is the well-known bipolar plate, which serves to separate fuel and oxidant and to connect the cathode of one cell to the anode of the adjacent cell in a stacked series. The cost of the machined graphite bipolar plates in PEM fuel cells accounts for as much as 60% of the overall fuel cell stack costs. Metallic bipolar plates offer the potential for significantly lower cost since they can be formed by readily available and inexpensive conventional metal forming processes.

Low cost graphite and carbon fiber net shape composites are under development to replace the machined graphite plates. However, gas permeability and strength issues require the composites to have a greater thickness than a corresponding metallic bipolar plate, which increases both volume and weight, making them less desirable for many applications where power density is important.

A well-known drawback of metallic bipolar plates is that they generally exhibit inadequate corrosion resistance, which leads to high electrical resistance and/or PEM contamination, degrading fuel cell performance to unacceptable levels. Corrosion-resistant coatings have been applied to metallic bipolar plates, but surface defects therein have limited the success thereof.

OBJECTS OF THE INVENTION

Accordingly, objects of the present invention include the provision of: metal bipolar plates and other metallic components having enhanced corrosion resistance without sacrificing electrical conductance thereof; efficient and low cost PEM fuel cells that last longer in corrosive environments, and improved power generation. Further and other objects of the present invention will become apparent from the description contained herein.

SUMMARY OF THE INVENTION

In accordance with one aspect of the present invention, the foregoing and other objects are achieved by a corrosion resistant, electrically conductive component which includes 20–55% Cr, balance base metal. The component has thereon a substantially external, continuous layer of chromium nitride.

In accordance with another aspect of the present invention, a proton exchange membrane fuel cell includes a corrosion resistant, electrically conductive bipolar plate. The bipolar plate includes 20–55% Cr, balance base metal. The component has thereon a substantially external, continuous layer of chromium nitride.

Figure 1:
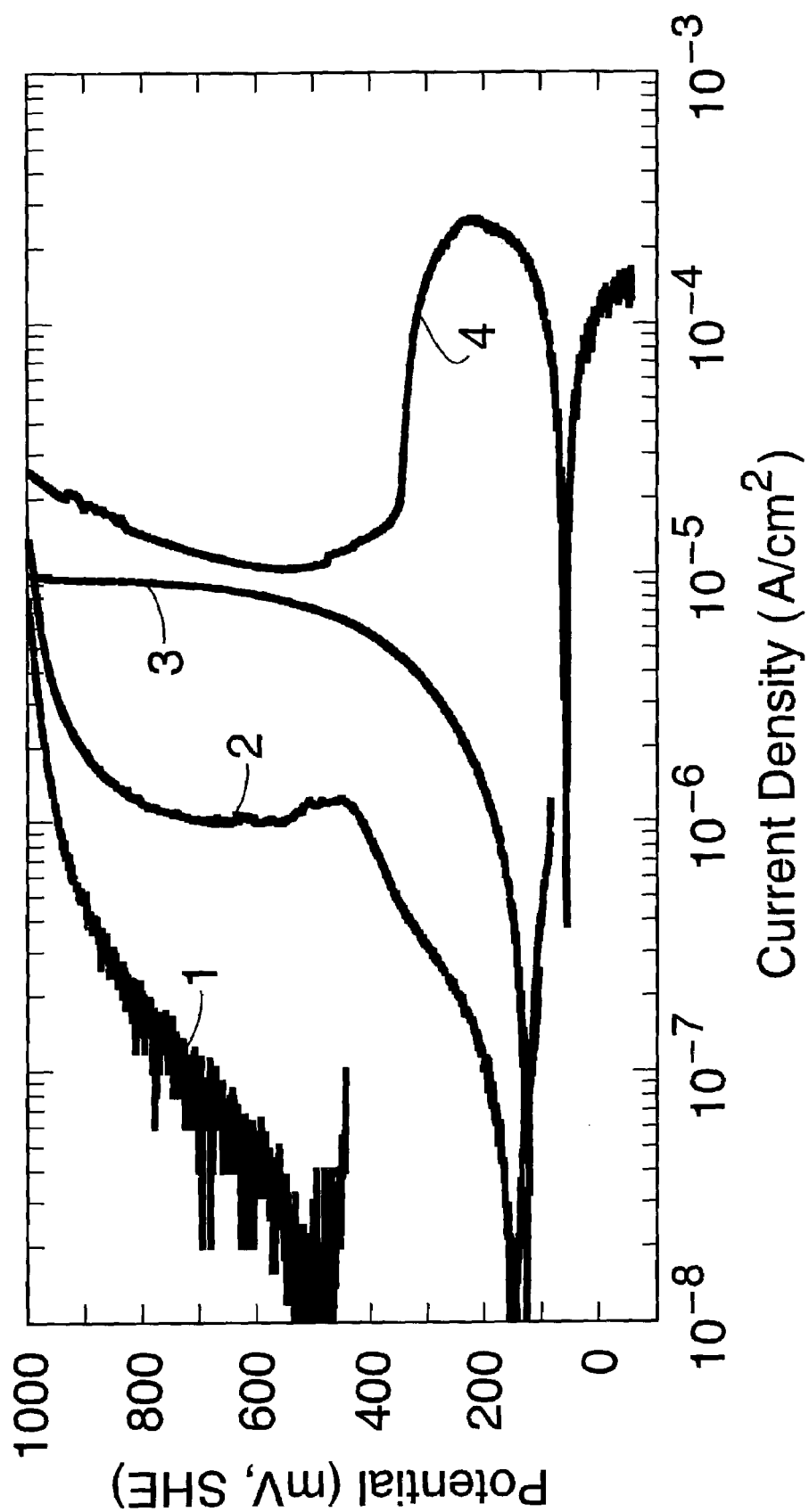
FIG. 1 is a graph showing anodic polarization curves for binary bipolar plate material made in accordance with the present invention compared with other materials.

For a better understanding of the present invention, together with other and further objects, advantages and capabilities thereof, reference is made to the following disclosure and appended claims in connection with the above-described drawings.

DETAILED DESCRIPTION OF THE INVENTION

Bipolar plate and other components made with base metal-Cr substrates have a distinct advantage in forming a nitride or carbonitride layer for corrosion protection. As the nitride or carbonitride layer is grown, three distinct, beneficial, and unexpected advantages are manifest:

1. Chromium nitrides and/or carbonitrides are formed preferentially over base metal nitrides and/or carbonitrides. The advantage is that chromium nitrides and carbonitrides are corrosion resistant, while the presence of base metal nitrides and carbonitrides would generally degrade corrosion resistance.
2. Chromium nitrides and/or carbonitrides are formed preferentially on the surface of the component rather than internally. The advantage is that corrosion resistance is needed at the surface. Internally formed corrosion resistant materials are not useful in that they leave the component surface exposed to corrosive environments.
3. Chromium nitrides and/or carbonitrides are formed with few or no defects that would allow corrosive materials to attack the component material therethrough.

Hence, the present invention provides an essentially uniform, defect-free, external layer of material that is both corrosion resistant and amenable to the function of the component. Chromium nitrides and carbonitrides are also highly electrically conductive.

Amounts of substances in component compositions described herein are given in wt. % unless specifically stated otherwise.

In some embodiments of the present invention, a key feature is the formation of an external, continuous, dense, surface nitride layer of $Cr_2N$ and/or CrN. A continuous or discontinuous outer layer of CrN may form over an inner $Cr_2N$ layer. $Cr_2N$ appears to have better overall corrosion resistance, but CrN may also be beneficial under some corrosion conditions, especially when present as an outer continuous layer.

The base alloy composition, microstructure, and nitridation process conditions should be selected and controlled in order to avoid, as much as possible:
1. Deleterious defects such as discontinuous surface $Cr_2N$ and/or introduction of substantial amounts of base metal such as Fe or Ni (more than 0.5–1%) into the nitride surface layer.
2. Formation of mixed ternary and higher-order Cr-nitrides with the base metal at the surface, for example, Cr—Fe—N and/or Ni—Cr—N phases.

Some embodiments of the invention employ a binary alloy comprising 20–55% Cr, balance Ni, preferably 30–53% Cr, balance Ni, more preferably 40–52% Cr, balance Ni, most preferably 45–51% Cr, balance Ni. Too little Cr will result in formation of an insufficient amount of $Cr_2N$ to produce a continuous layer thereof. Too much Cr will result in a composition that work-hardens too quickly and is difficult to deform mechanically into the desired shape. The amount of Cr is desirably minimized due to higher cost thereof.

Base metal is defined, for the purposes of describing the present invention, as any metal or alloy that is compatible with Cr. Although Ni is shown herein to be a particularly good base metal, ternary Fe(Ni)—Cr or Ni(Fe)—Cr alloys (ferritic and/or austenitic) with Cr levels in the ranges set forth hereinabove are also expected to exhibit external Cr-nitride layer (also referred to as scale) formation and corresponding excellent corrosion resistance in accordance with the present invention. Base metals Ni, Ni(Fe), Fe(Ni), and Fe and alloys are preferred. As examples of the variability of the composition, Fe-based alloys can contain 5–25%Ni, and Ni-based alloys can contain 5–25% Fe. Other alloy bases, notably Co, or cladding of these base metals onto less expensive substrates (e.g. Cu, Al, Fe, or stainless steels) are also feasible.

Alloying additions of other elements are useful to decrease the permeability of nitrogen in the component, and to reduce the level of Cr and/or Ni and/or Fe in the alloy needed to form the desired external Cr nitride layer. Reduction in Cr and Ni is favored to reduce cost and/or improve manufacturability. Examples of alloying additions include, but are not limited to, at least one of Co, Cu, Fe, Mn, and Mo. Ni addition to Fe base alloys is also similarly beneficial. Such alloying additions are generally in the range of 3–20%, but can be more or less, depending on the specific composition of the component.

Additions of reactive elements and/or rare earth elements can be used to modify the growth of the nitride layer to make it more inward growing and adherent. Additions of Hf and Zr are particularly favored due to their great stability with nitrogen and solubility in Ni. Additions of Y, La, Ce, and combinations thereof such as in misch metal are also suggested. Additions of reactive elements and/or rare earth elements are generally in the range of up to 1%, preferably 0.05–0.5%.

Alloying additions to modify the Cr-nitride may also be effective to further improve stability/corrosion resistance. These include refractory and transition metal elements of greater stability with nitrogen than Cr, particularly Nb, Ti, V, and Zr. Such alloying additions are generally in the range of up to 10%, with preferable ranges of up to 3% for Zr, Ti and 3–7% for Nb, V.

Thermal nitridation and/or carbonitridation are carried out according to well-known methods. For nitridation methods, resultant nitrogen levels in the range of 1–5 $mg/cm^2$ are the general target with levels in the range of 2–3 $mg/cm^2$ being preferred to minimize the chances for scale spallation or cracking.

Nitridation was generally conducted at a temperature in the range of 800° C. to 1200° C. in pure nitrogen or 96% nitrogen-4% hydrogen mixtures, although a temperature as low as 400° C. in ammonia environments is also suitable. The alloys can also be nitrided in a graphite furnace to introduce carbon into the nitride layer, which can further increase corrosion resistance. Carburization, carbonitridation, and boronization are also expected to produce similar corrosion resistant layers. The surface treatment can also be accomplished by plasma assisted and related processes well established in the art, which permit lower temperature nitridation.

External nitride formation can also be favored by use of a gaseous atmosphere with a reduced nitrogen partial pressure. Such conditions are well known to favor external nitridation reactions over discontinuous internal nitridation due to the corresponding decrease in alloy nitrogen solubility and inward nitrogen flux. Such a method can also be used to eliminate formation of less stable base metal nitrides.

External Cr-nitride formation can also be accomplished by first forming a Cr oxide layer, which enriches the surface with Cr, and subsequently converting the Cr-oxide to Cr-nitride by a nitridation method particularly using ammonia or other nitrogen hydrogen mixtures. This is particularly beneficial because the critical Cr concentration to form an external layer is much lower for oxidation than nitridation in most alloys.

EXAMPLE I

An alloy of composition Ni-50Cr was arc-cast and then heat-treated at 1100° C. for 8 h in vacuum. Alloy coupons were cut and abraded to a 240–600 grit surface finish. Nitridation of the coupons was carried out by heating in nitrogen at a temperature of 1100° C. for various periods of time: 1, 2, and 3 hours. The coupons treated for 2 hours resulted in 2 $mg/cm^2$ nitrogen. Corrosion resistance performance thereof was tested and compared to other materials by exposure to aerated pH 3 sulfuric acid at a temperature of 80° C. Results of the tests are shown in FIG. 1.

FIG. 1 shows anodic polarization curves (scan rate 0.1 mV/sec) for various bipolar plate materials tested in Example I. Curve 1 is for nitrided Ni-50Cr prepared as described above in Example I. Curve 2 is for non-nitrided Ni-50Cr. Curve 3 is for commercial purity Ti. Curve 4 is for commercial purity Ni. Data show that corrosion resistance performance of material made in accordance with the present invention is significantly better than for other tested materials.

Figure 2:
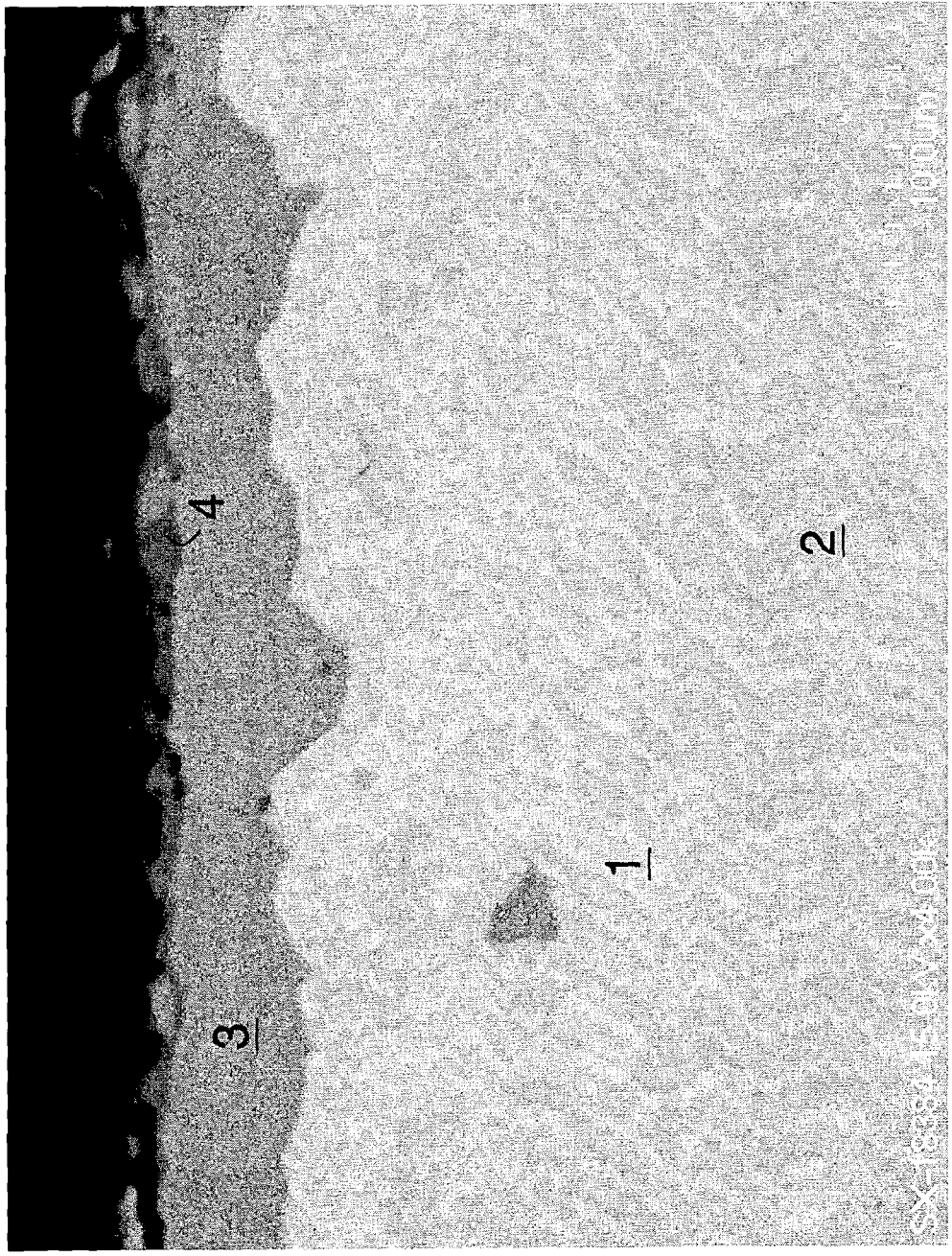
FIG. 2 is a scanning electron photomicrograph showing a cross-section of Ni-50Cr (Cr 50%, balance Ni) nitrided at 1100° C. for 1 hr. in $N_2$ in accordance with the present invention.

FIG. 2 shows the microstructure of a cross-section of Ni-50Cr with its surface nitrided as described above in Example I. Four distinct regions are visible: base material 1 comprised of Ni-50Cr; ternary π Ni—Cr—N phase 2, which is not significantly corrosion resistant; a continuous external $Cr_2N$ surface layer 3, which is the key source of corrosion protection for the alloy; and an overlying, discontinuous CrN phase 4.

EXAMPLE II

Figure 3:
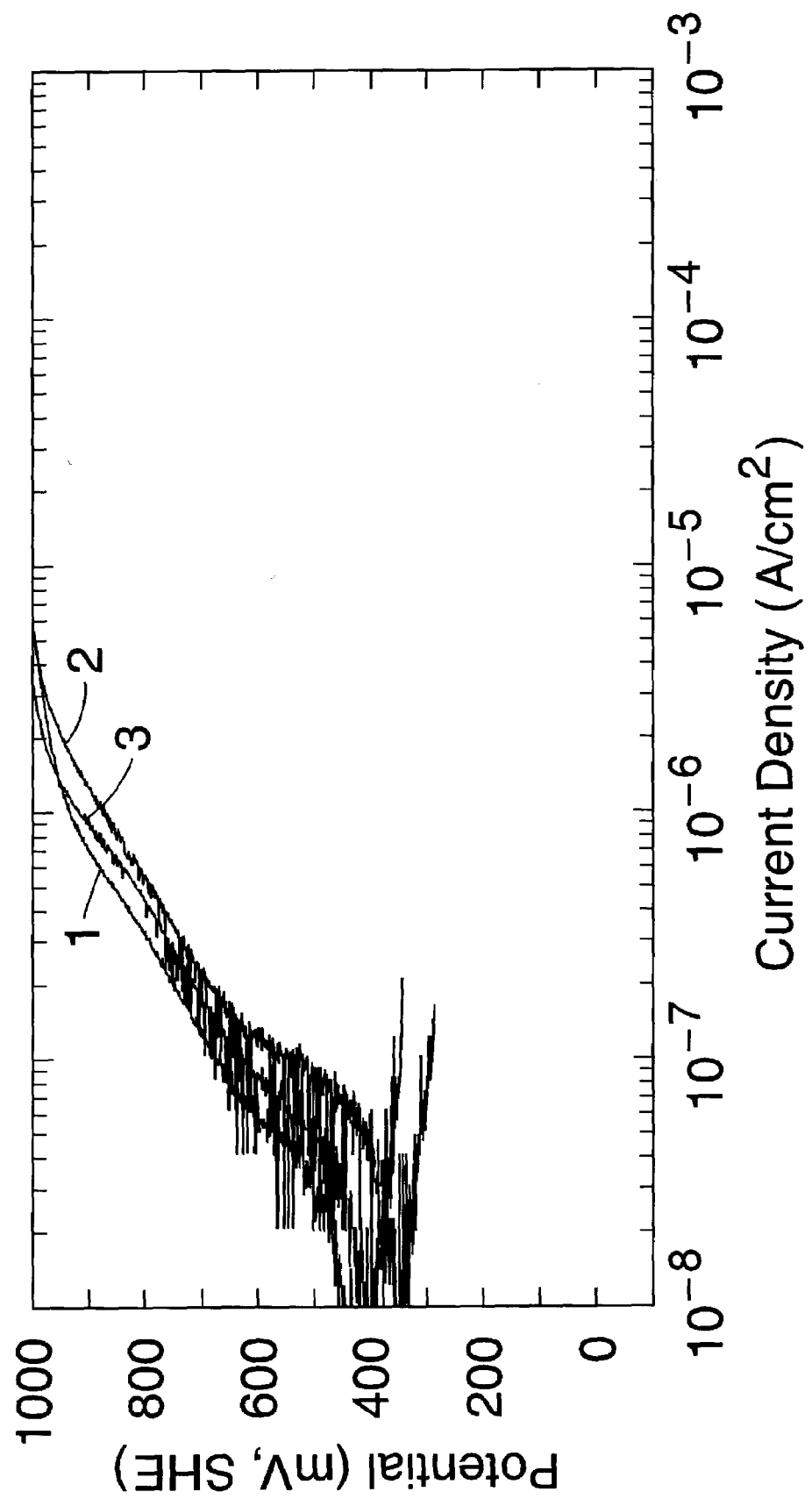
FIG. 3 is a graph showing anodic polarization curves for ternary bipolar plate materials made in accordance with the present invention.

Ni-42Cr base alloys were modified with Mo, Mn, Fe additions and nitrided as described in Example I. Corrosion resistance performance thereof was tested as described in Example I. Results are shown in FIG. 3, which shows anodic polarization curves (scan rate 0.1 mV/sec) for three modified Ni-42Cr base alloys as follows:

1. Nitrided Ni-42Cr-5Mn, 2.8 mg/cm$^2$N
2. Nitrided Ni-42Cr-5Mo, 1.6 mg/cm$^2$N
3. Nitrided Ni-42Cr-10Fe, 2.0 mg/cm$^2$N The bipolar plate materials of the present invention are also applicable to direct methanol fuel cell, battery, and other low temperature (<200–300° C. operation) fuel cell (e.g. phosphoric acid fuel cell) and electrochemical-based power generation devices where metallic components requiring a combination of electrical conductivity and corrosion resistance are needed.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A corrosion resistant, electrically conductive component, comprising:
    an alloy substrate comprising 20–55 wt. % Cr, balance at least one base metal selected from the group consisting of Ni, Fe and Co, and
    a continuous surface layer essentially free of oxide and base metal comprising at least one composition selected from the group consisting of chromium nitride and chromium carbonitride.

2. A component in accordance with claim 1 wherein said wt. % Cr comprises 30–53 wt. %.

3. A component in accordance with claim 1, wherein said alloy substrate further comprises one or more nitrogen permeability decreasing alloying additives selected from the group consisting of 3–20 wt. % Cu, 3–20 wt. % Mn, and 3–20 wt. % Mo.

4. A component in accordance with claim 1, wherein said alloy substrate further comprises one or more nitride layer adhesion enhancing alloying additives at a level of up to 1 wt. % selected from the group consisting of Hf, Zr, Y, La, and Ce.

5. A component in accordance with claim 1, wherein said alloy substrate further comprises one or more nitride layer stability improving alloying additives at a level of up to 10 wt. % selected from the group consisting of Nb, Ti, V, and Zr.

6. A component in accordance with claim 1 wherein said chromium nitride comprises at least one compound selected from the group consisting of Cr$_2$N and CrN.

7. A component in accordance with claim 1 wherein said continuous surface layer has a structure and composition profile characteristic of being thermally formed in a temperature range of 800° C. to 1200° C.

8. A component in accordance wit claim 1 wherein said component comprises a bipolar plate for an electrochemical device.

9. A component in accordance with claim 1 wherein said alloy substrate comprises a composition selected from the group consisting of: 50 wt. % Cr, balance Ni, 42 wt. % Cr, 5 wt. % Mn, balance Ni; 42 wt. % Cr, 5 wt. % Mo, balance Ni; and 42 wt. % Cr, 10 wt. % Fe, balance Ni.

10. A component in accordance with claim 9 wherein said component comprises a bipolar plate for an electrochemical device.

11. An electrochemical-based power generator, comprising:
    a corrosion resistant, electrically conductive bipolar plate, said bipolar plate comprising an alloy substrate of 20–55 wt % Cr, balance at least one base metal selected from the group consisting of Ni, Fe and Co, said component having thereon a continuous surface layer essentially free of oxide and base metal comprising at least one composition selected from the group consisting of chromium nitride and chromium carbonitride.

12. The generator of claim 11 wherein said wt. % Cr comprises 30–53 wt. %.

13. The generator of claim 11 wherein said alloy substrate further comprises one or more nitrogen permeability decreasing alloying additive selected from the group consisting of 3–20 wt. % Cu, 3–20 wt. % Mn, and 3–20 wt. % Mo.

14. The generator of claim 11 wherein said alloy substrate further comprises one or more nitride layer adhesion enhancing alloying additive at a level of up to 1 wt. % selected from the group consisting of Hf, Zr, Y, La, and Ce.

15. The generator of claim 11 wherein said alloy substrate further comprises one or more nitride layer stability improving alloying additive at a level of up to 10 wt. % selected from the group consisting of Nb, Ti, V, and Zr.

16. The generator of claim 11 wherein said chromium nitride comprises at least one compound selected from the group consisting of Cr$_2$N and CrN.

17. The generator of claim 11 wherein said continuous surface layer has a structure and composition profile characteristic of being thermally formed in a temperature range of 800° C. to 1200° C.

18. The generator of claim 11 wherein said generator comprises a fuel cell.

* * * * *